United States Patent
Balaj et al.

(10) Patent No.: US 12,173,991 B1
(45) Date of Patent: Dec. 24, 2024

(54) MODULAR BALLISTIC SHIELD SYSTEM SYSTEM AND DEVICE

(71) Applicants: Charles Balaj, Kettering, OH (US); William Mitchell, Kettering, OH (US); Shawn A. Kalis, Beavercreek, OH (US)

(72) Inventors: Charles Balaj, Kettering, OH (US); William Mitchell, Kettering, OH (US); Shawn A. Kalis, Beavercreek, OH (US)

(73) Assignee: Hyperion Technology Group, Inc., Tupelo, MS (US)

( * ) Notice: Subject to any disclaimer, the term of this patent is extended or adjusted under 35 U.S.C. 154(b) by 0 days.

(21) Appl. No.: 18/234,426

(22) Filed: Aug. 16, 2023

Related U.S. Application Data (60) Provisional application No. 63/403,243, filed on Sep. 1, 2022.

(51) Int. Cl.
*F41H 5/08* (2006.01)
*H04N 7/18* (2006.01)

(52) U.S. Cl.
CPC .............. *F41H 5/08* (2013.01); *H04N 7/183* (2013.01)

(58) Field of Classification Search
CPC ........... H04N 7/183; F41H 5/266; F41H 5/24; F41H 5/06; F41H 5/00; F41H 5/08
USPC .......... 89/36.14, 36.09, 36.07, 36.04, 36.05, 89/36.02, 36.01
See application file for complete search history.

(56) References Cited

U.S. PATENT DOCUMENTS

| | | | |
|---|---|---|---|
| 10,619,978 B1 * | 4/2020 | Ackley | F41H 5/02 |
| 11,650,029 B1 * | 5/2023 | Horvatich | F41H 5/26 89/36.08 |
| 2016/0061569 A1 * | 3/2016 | Fernandez | F41H 5/08 89/36.02 |
| 2022/0276025 A1 * | 9/2022 | Jackson, Sr. | F16M 13/04 |
| 2024/0044620 A1 * | 2/2024 | Oostvogel | F41H 5/08 |

* cited by examiner

*Primary Examiner* — John Cooper
(74) *Attorney, Agent, or Firm* — Veritay Group, Ip PLLC; Susan Fentress (57) ABSTRACT

The present invention provides a ballistic shield made of an optically opaque bulletproof shield having a back and a front side, wherein the shield does not include a transparent view window. Further, the ballistic shield includes at least one arm or hand hold centrally located on the back side of the bulletproof shield. A plurality of cameras is located on the front side of the bulletproof shield, at least one of the plurality of cameras operating in an electro-optical spectrum, and at least one of the plurality of cameras operating in the infra-red (IR) spectrum, wherein the plurality of cameras capture at least one image and a plurality of light emitting sources located on the front side of the bulletproof shield. Further, the ballistic shield includes a screen for viewing at least one image, wherein the screen is located on the back of the shield.

5 Claims, 11 Drawing Sheets

MODULAR BALLISTIC SHIELD SYSTEM SYSTEM AND DEVICE

FIELD OF THE INVENTION

Embodiments of the present invention are in the field of a ballistic shield and more particularly to such devices that exclude the use of a transparent view window or a viewport and have a plurality of cameras and light-emitting sources installed on the front of the shield along with a control unit and a display screen at the rear of the shield to display what is in front of the shield.

BACKGROUND OF THE INVENTION

Military personnel and civilian law enforcement agency officers routinely operate in environments where danger from firearms exists. Firearms that may be used against personnel include small arms as well as rifle-caliber weapons. Ballistic shields have been used for several years to protect personnel when fired upon. Early ballistic shields consisted of shaped sheet metal with a thin eye slot hole for vision. These were very heavy, which limited their usage in certain tactical situations. Even today, some ballistic shields do not have a way for the user to see through the shield, forcing them to look over or around the shield to see what is in front of them, exposing them to grave danger. Other ballistic shields utilize a viewport constructed of thick ballistic glass. For a person using the shield in a hostile environment, the person must be directly behind the shield and must look through the ballistic glass, which can be several inches thick and provides less than optimal viewing. In addition, traditional rifle-rated shields become impracticable to use in a hand-held manner due to weight constraints. New ballistic technology is evolving to allow small arms and rifle-rated shields to be constructed using new lightweight materials.

However, one limitation of these new shields is that a traditional ballistic glass viewport is not practical to be installed for several reasons, the primary one being that the new shields are much thinner than the ballistic glass. Hence, an obvious approach would be to either downgrade the safety level of the ballistic shield for viewport glass to fit in or come up with a solution for the user to be able to see through the shield without compromising the safety level of the shield. Thus, there remains a need for an advanced tactical ballistic shield that offers the latest advanced level protection including a viewport that remains unaffected by the thinness of the ballistic shield to be installed upon.

SUMMARY OF THE INVENTION

The present invention aims to offer a device installed on a ballistic shield. The device is integrated with cameras and light-emitting sources. Additionally, the device installed on the ballistic shield offers a means of capturing images of what is in front of the shield and displaying the images on a display screen installed on the back of the shield. In inventive subject matter includes a ballistic shield made of: an optically opaque bulletproof shield having a back side and a front side, the shield sized to protect a person, wherein the shield does not include a transparent view window; at least one arm or hand hold centrally located on the back side of the bulletproof shield; a plurality of cameras located on the front side of the bulletproof shield, at least one of the plurality of cameras operating in an electro-optical spectrum, and at least one of the plurality of cameras operating in the infra-red (IR) spectrum, wherein the plurality of cameras capture at least one image; and a screen for viewing at least one image, wherein the screen is located on the backside of the ballistic shield.

In one exemplary embodiment, the device installed on the ballistic shield includes a front box protruding from the front of the shield spanning nearly the horizontal length of the shield, wherein the at least one front box includes at least two cameras on each horizontal end of the front box for capturing at least two images in front of the ballistic shield. A modular system configured to adapt a ballistic shield for viewing an image is provided. The system includes a front box configured to be installed upon a front side of the ballistic shield via a plurality of mounting brackets, wherein the front box includes at least two cameras positioned to capture at least two images in front of the ballistic shield; wherein one of the two cameras operates in an electro-optical spectrum, and one of the two cameras operates in the infra-red (IR) spectrum; and a rear box configured to be installed upon a back side of the ballistic shield via a plurality of mounting brackets, wherein the rear box including: a screen for viewing at least one of the at least two images and a switch for powering an electronic component of the front box.

In one exemplary embodiment the device installed on the ballistic shield includes at least two light emitting sources; wherein the at least two light emitting sources are located near the at least two cameras on each end of the front box.

In one exemplary embodiment, the ballistic shield includes at least one rear box protruding from the back of the shield spanning nearly the horizontal length of the shield wherein at least one rear box includes a switch for powering the electronic components of the front box, a switch for selectively activating the at least two light emitting sources, at least one switch for selectively activating the at least two cameras.

In one exemplary embodiment, the device installed on the ballistic shield includes a display screen for viewing at least one image of the at least two images; wherein the display screen is located on the at least one rear box or a second rear box located on the back of the shield.

BRIEF DESCRIPTION OF THE DRAWINGS

Embodiments of the present invention described herein are exemplary, and not restrictive. Embodiments will now be described, by way of examples, with reference to the accompanying drawings. In these drawings, each identical or nearly identical component that is illustrated in various figures is represented by a reference number. For purposes of clarity, not every component is labeled in every drawing. The drawings are not necessarily drawn to scale, with emphasis instead being placed on illustrating various aspects of the techniques and devices described herein.

The foregoing and other objects, aspects, and advantages are better understood from the following detailed description of a preferred embodiment of the invention with reference to the drawings, in which.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The present invention discloses a device installed on a ballistic shield allowing an operator to have a clear view of a hostile area while remaining safely behind the traditional or advanced ballistic shield. A stand-alone, adaptable, rapidly replaceable, and deployable device composed of three main sub-systems that can be installed on a ballistic shield constructed of old or new shield technology. The device allows an operator to have a clear view of a hostile area while remaining safely behind the traditional or advanced ballistic shield. In addition, the device provides an ability to accommodate a capability to identify threats in certain hazardous situations without exposing the operator to potential hazards.

Figure 1:
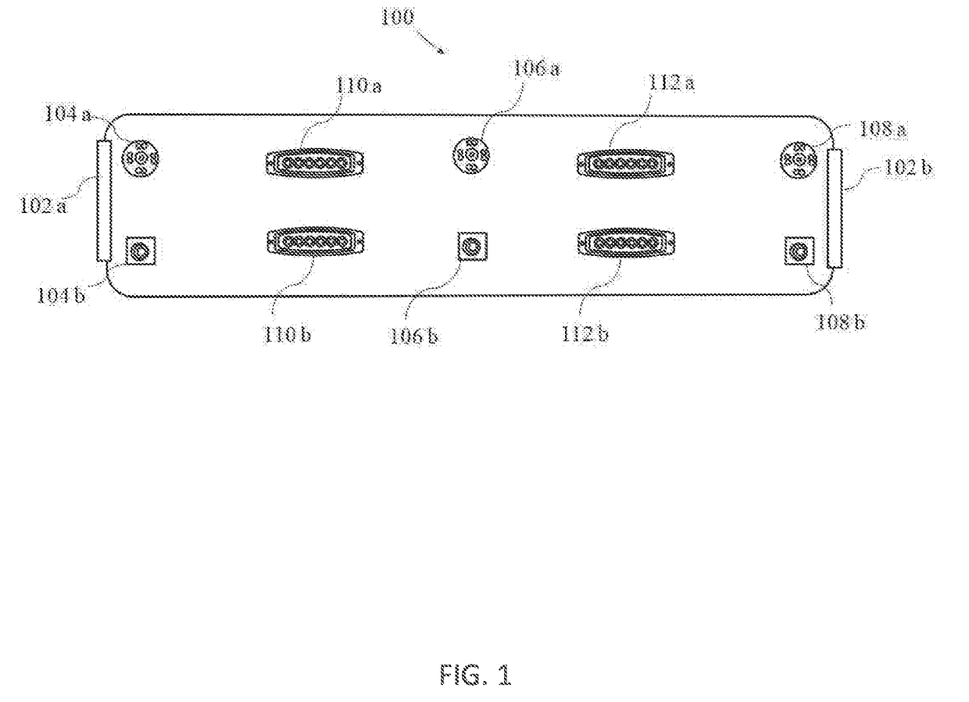
FIG. 1 shows a perspective front view of a front box configured to be installed upon a ballistic shield via mounting brackets, in accordance with a preferred embodiment of the present invention.

FIG. 1 illustrates a perspective front view of a front box 100 configured to be installed upon a ballistic shield via mounting brackets 102a, 102b, in accordance with the preferred embodiment of the present invention. The front box 100 protrudes from the front side of the ballistic shield, spanning or nearly the horizontal length of the ballistic shield. In accordance with one embodiment of the invention, the dimensions of the front box 100 are around 8×24 inches (length×breadth). The front box 100 houses a first pair of cameras 104a, 104b, a second pair of cameras 106a, 106b, and a third pair of cameras 108a, 108b. The first pair of cameras 104a, 104b is located on the left side of the front box 100, the second pair of cameras 106a, 106b is located at the center of the front box 100, and the third pair of cameras 108a, 108b is located on the right side of the front box 100. The first pair of cameras 104a, 104b, the second pair of cameras 106a, 106b, and the third pair of cameras 108a, 108b are configured for capturing at least two images in front of the ballistic shield. The at least two images can be still images or a video.

Each pair of cameras include an electro-optical camera and an infrared camera. Further, the front box 100 incorporates a first pair of light emitting sources 110a, 110b, and a second pair of light emitting sources 112a, 112b. The first pair of light emitting sources 110a, 110b is located between the first pair of cameras 104a, 104b and the second pair of cameras 106a, 106b. The second pair of light emitting sources 112a, 112b is located between the second pair of cameras 106a, 106b and the third pair of cameras 108a, 108b.

Figure 2:
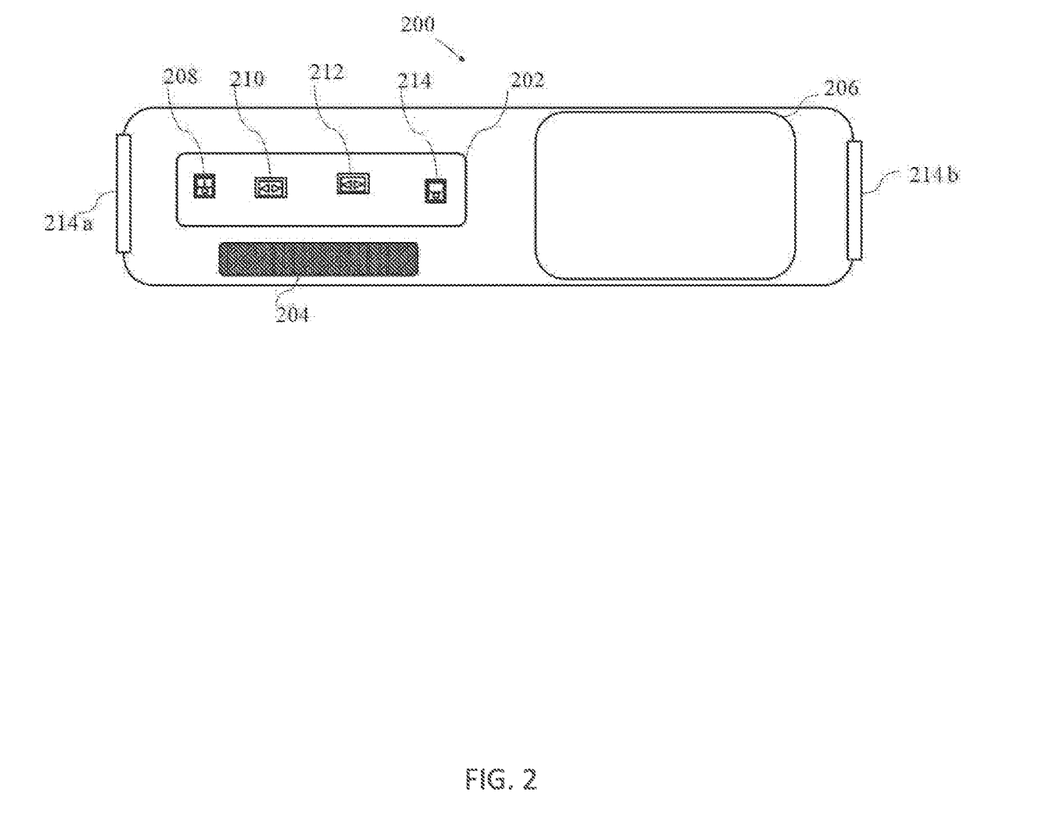
FIG. 2 shows a perspective rear view of a rear box configured to be installed upon a ballistic shield via mounting brackets, in accordance with an exemplary embodiment of the present invention.

FIG. 2 illustrates a perspective rear view of a rear box 200 configured to be installed upon a ballistic shield via one or more mounting brackets 214a, 214b, in accordance with an exemplary embodiment of the present invention. The rear box 200 protrudes from the back side of the ballistic shield spanning nearly the horizontal length of the ballistic shield. In accordance with one embodiment of the invention, the dimensions of the rear box 200 are around 8×24 inches (length×breadth). The rear box 200 includes a control unit 202, a processing unit 204, a rechargeable battery, and a display screen 206. The processing unit 204 is configured to process the at least two images captured by the pair of cameras using one or more deep learning modules. The one or more deep learning modules assist with identifying and tracking potential threats on the display screen 206.

The system is modular because the front box 100 and the rear box 200 can be installed on a ballistic shield allowing an operator to have a clear view of a hostile area while remaining safely behind the traditional or advanced ballistic shield.

The display screen 206 is configured for displaying the at least one image of the at least two images captured by the first pair of cameras, the second pair of cameras, or the third pair of cameras. The display screen 206 is located on the at least one rear box 200 or a second rear box (not shown) located on the back of the ballistic shield. The control unit 202 includes a power switch 208, a first selector switch 210, a second selector unit 212, and a light switch 214. The power switch 208 is configured to switch between a power-on and power-off mode of the rear box. The light switch 214 is configured to switch between the power on and power off mode of the first pair of light emitting sources, and the second pair of light emitting sources. The first selector switch 210 enables the user to make a selection between at least one electro-optical camera and at least one infrared camera from the pair of cameras. The second selector unit 212 is configured to toggle amongst the pair of cameras located at the left side, the right side, and the center of the front box.

In one exemplary embodiment of the present invention, multiple Machine Learning applications can be integrated into the processing unit that could alert the user that a firearm has been detected in the field of view.

In one exemplary embodiment, the processing unit is configured to transmit the at least two images to an external device through a wireless network. In one example, the external device can be located inside a command vehicle or command center. The external device can be a smart phone, a laptop, a tablet, or any other operating system-enabled device. The wireless network can be Bluetooth technology, Wi-Fi networks, ad hoc Wi-Fi networks, Radio Frequency (RF) transmission, a combination of these technologies, or other similar technologies.

In one exemplary embodiment of the present invention, the front box and rear box can be easily replaced on the ballistic shield in case they become damaged or non-operational during operations, or the entire system could be swapped onto another shield if a shield upon which it was mounted becomes unserviceable, e.g., handles or straps break, etc.

In one exemplary embodiment of the present invention, the front box and rear box installed on the shield are made from thermoplastic or thermosetting (thermoset) materials (in filament, liquid resin, or powder form) used in three-dimensional (3D) printing processes, including Fused Deposition Modeling (FDM), Stereolithography (SLA), and Selective laser sintering (SLS). Depending upon the 3D printing style chosen, specific materials could include ABS (acrylonitrile butadiene styrene), PLA (polylactic acid), PETG (polyethylene terephthalate glycol), Nylon or Nylon composites (carbon fiber, Kevlar, fiberglass, etc.)

Figure 3:
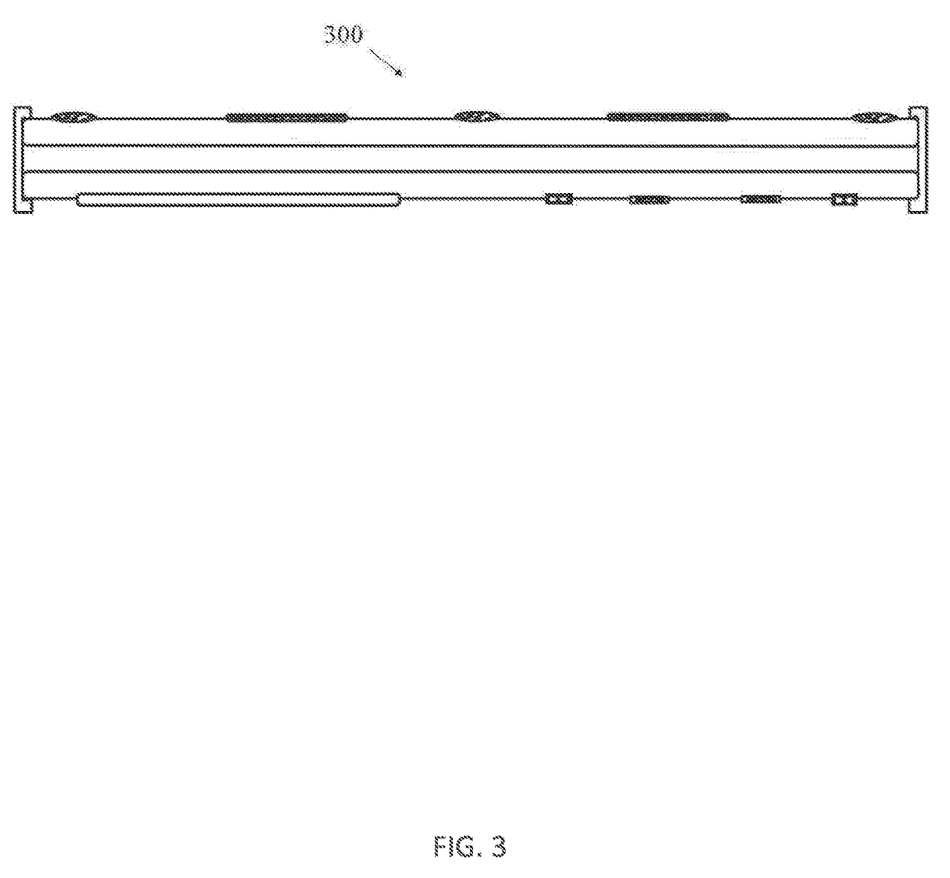
FIG. 3 shows a perspective top view of the front box, in accordance with an exemplary embodiment of the present invention.

FIG. 3 illustrates a perspective top view 300 of the front box in accordance with an exemplary embodiment of the present invention.

Figure 4:
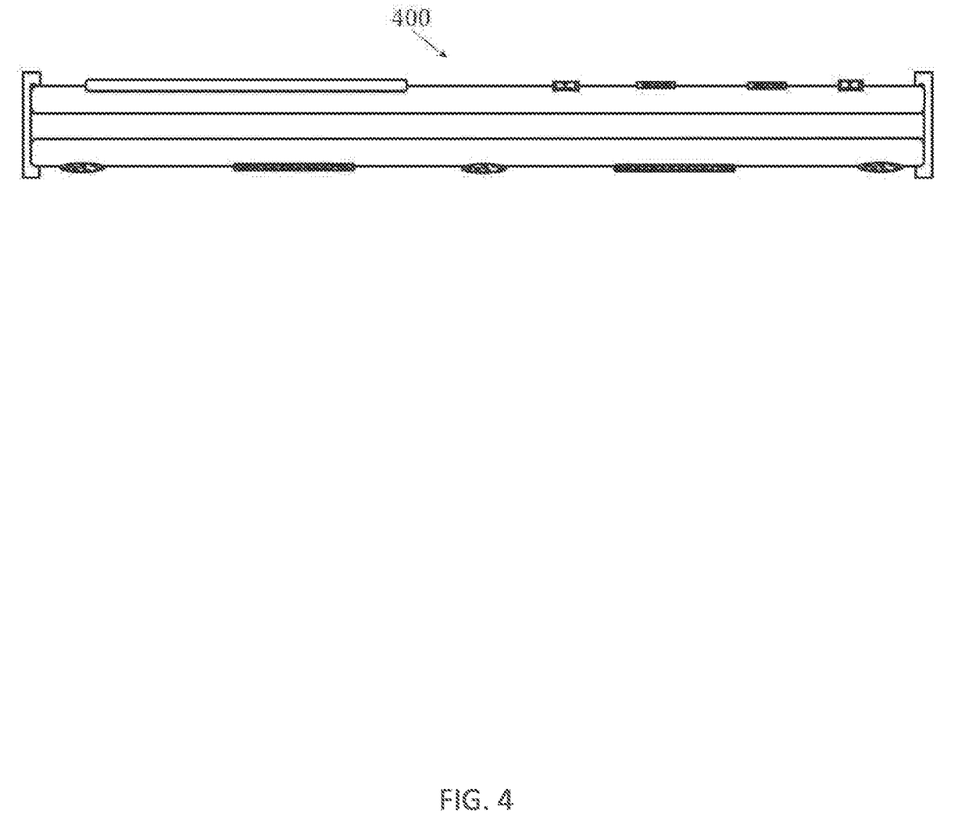
FIG. 4 shows a perspective top view of the rear box, in accordance with an exemplary embodiment of the present invention.

FIG. 4 illustrates a perspective bottom view 400 of the rear box, in accordance with an exemplary embodiment of the present invention.

Figure 5:
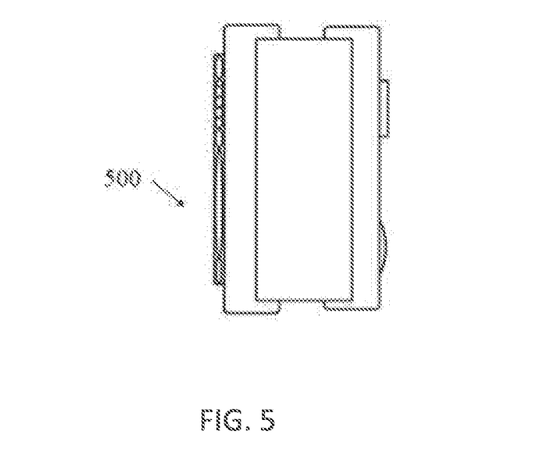
FIG. 5 illustrates a perspective left-side view of the front and rear box, in accordance with an exemplary embodiment of the present invention.
Figure 6:
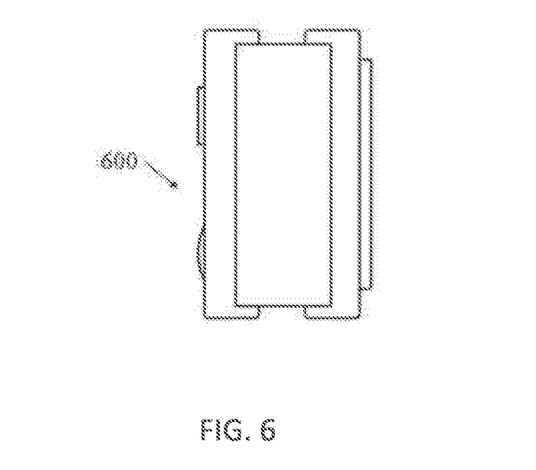
FIG. 6 illustrates a perspective right-side view of the front and rear box, in accordance with an exemplary embodiment of the present invention.

FIG. 5 and FIG. 6 illustrate perspective side views 500, 600 of the front and rear box, in accordance with an exemplary embodiment of the present invention.

Figure 7:
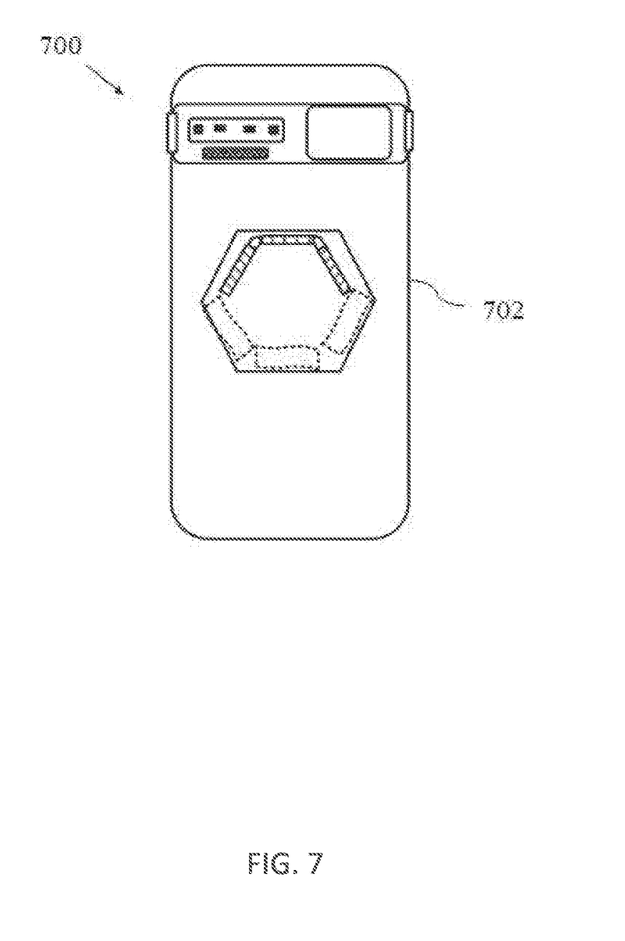
FIG. 7 illustrates a perspective rear view of the rear box mounted on a ballistic shield, in accordance with an exemplary embodiment of the present invention.

FIG. 7 illustrates a perspective rear view 700 of the rear box mounted on a rear-side (702) of the ballistic shield, in accordance with an exemplary embodiment of the present invention.

Figure 8:
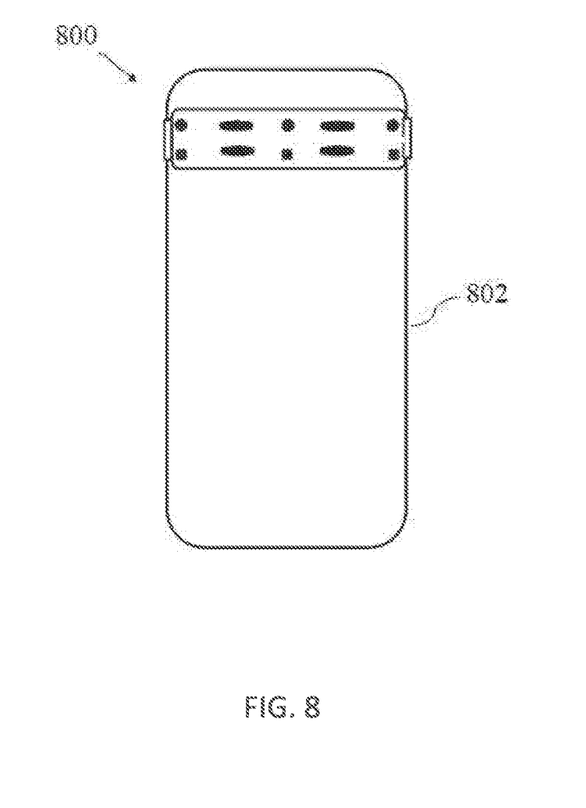
FIG. 8 illustrates a perspective front view of a front box installed on a ballistic shield, in accordance with an exemplary embodiment of the present invention.

FIG. 8 illustrates a perspective front view 800 of a front box installed on a front side (802) of the ballistic shield, in accordance with an exemplary embodiment of the present invention.

Figure 9:
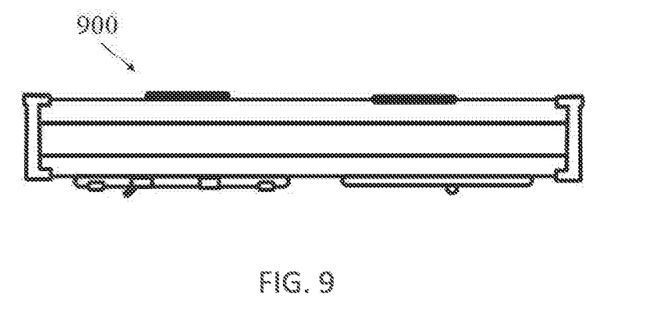
FIG. 9 illustrates a perspective top view of the front box and the rear box installed on a ballistic shield, in accordance with an exemplary embodiment of the present invention.
Figure 10:
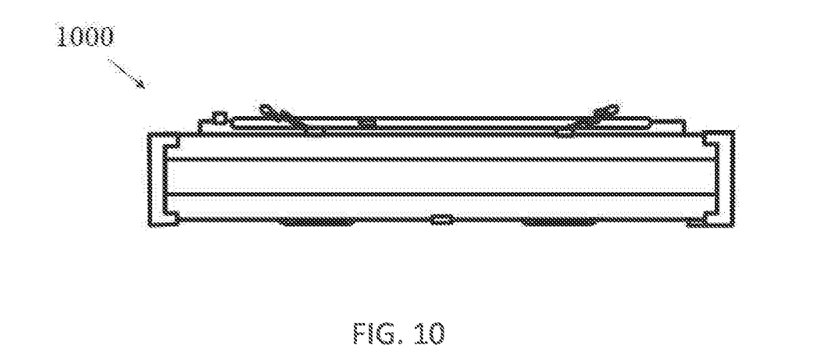
FIG. 10 illustrates a perspective bottom view of the front box and the rear box installed on a ballistic shield, in accordance with an exemplary embodiment of the present invention.

FIG. 9 and FIG. 10 illustrate a perspective top 900 and bottom view 1000 of the front box and rear box installed on the ballistic shield, in accordance with an exemplary embodiment of the present invention.

Figure 11:
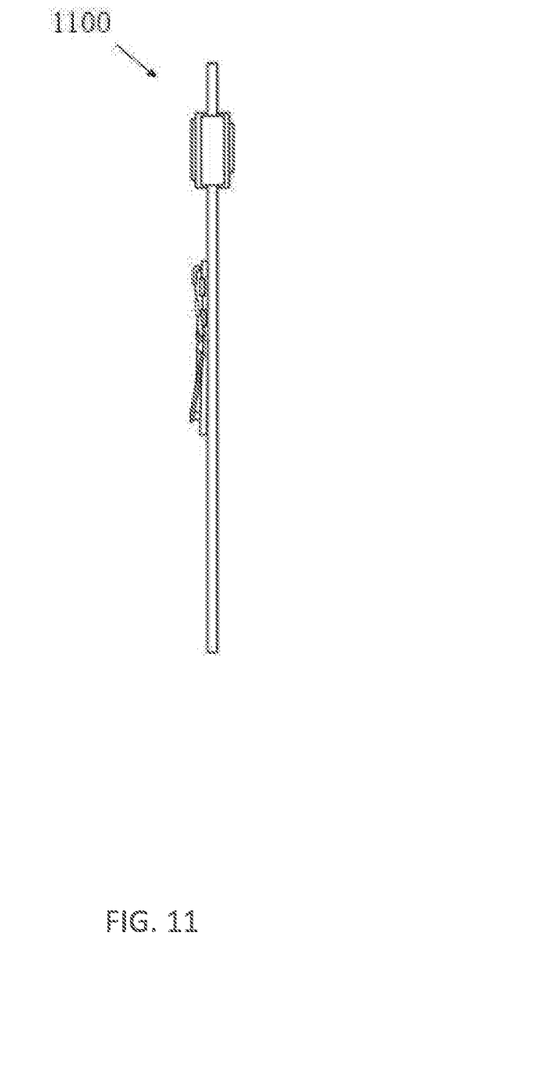
FIG. 11 illustrates a perspective side view of the front box installed on a ballistic shield, in accordance with an exemplary embodiment of the present invention.
Figure 12:
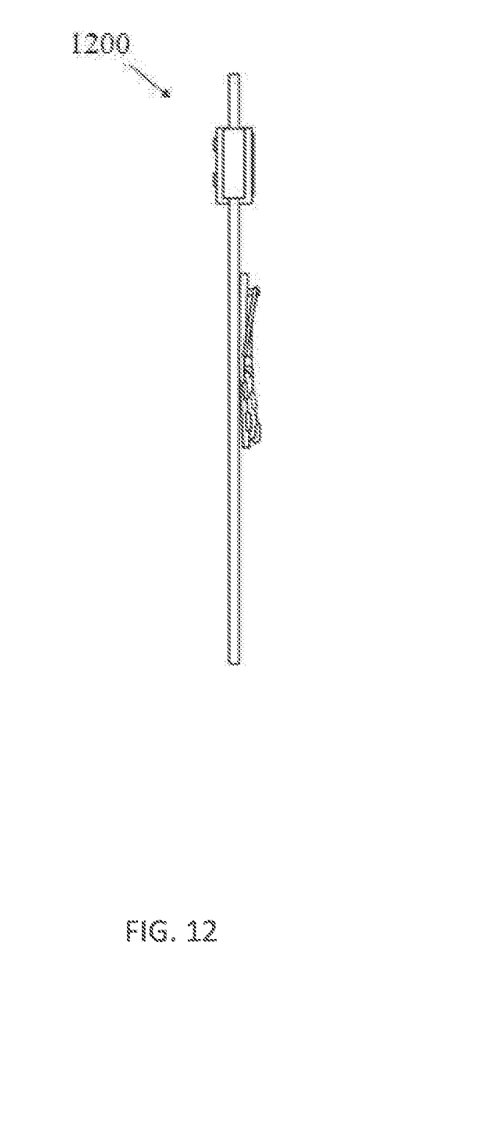
FIG. 12 illustrates a perspective side view of the rear box installed on a ballistic shield, in accordance with an exemplary embodiment of the present invention.

FIG. 11 and FIG. 12 illustrate perspective side views 1100, 1200 of the front box and rear box installed on the ballistic shield, in accordance with an exemplary embodiment of the present invention.

Embodiments of this device may include an 8 megapixel camera with a 180 degree field of view. The camera may include an IT-CUT filter that is turned on in daylight conditions to block infrared wavelengths and allow only visible spectrum wavelengths. In nighttime conditions the filter is turned on to capture IR wavelengths for night vison viewing. The camera is based off the IMX219 Sensor. IMX219 is a diagonal 4.60 mm (Type 1/4.0) CMOS active pixel type image sensor with a square pixel array and 8.08M effective pixels. This chip operates with three power supplies, analogue 2.8V, digital 1.2 V, and IF 1.8 V, and has low power consumption. High sensitivity, low dark current, and no smear are achieved through the adoption of R, G, and B primary color pigment mosaic filters. This chip features an electronic shutter with variable charge-storage time.

In this embodiment the cameras are controlled by a streaming application. The streaming application was developed in C++ with libcamera, OpenCV, and gtkmm. The term streaming app encompasses the software and hardware used to transmit video content to a user.

Figure 13:
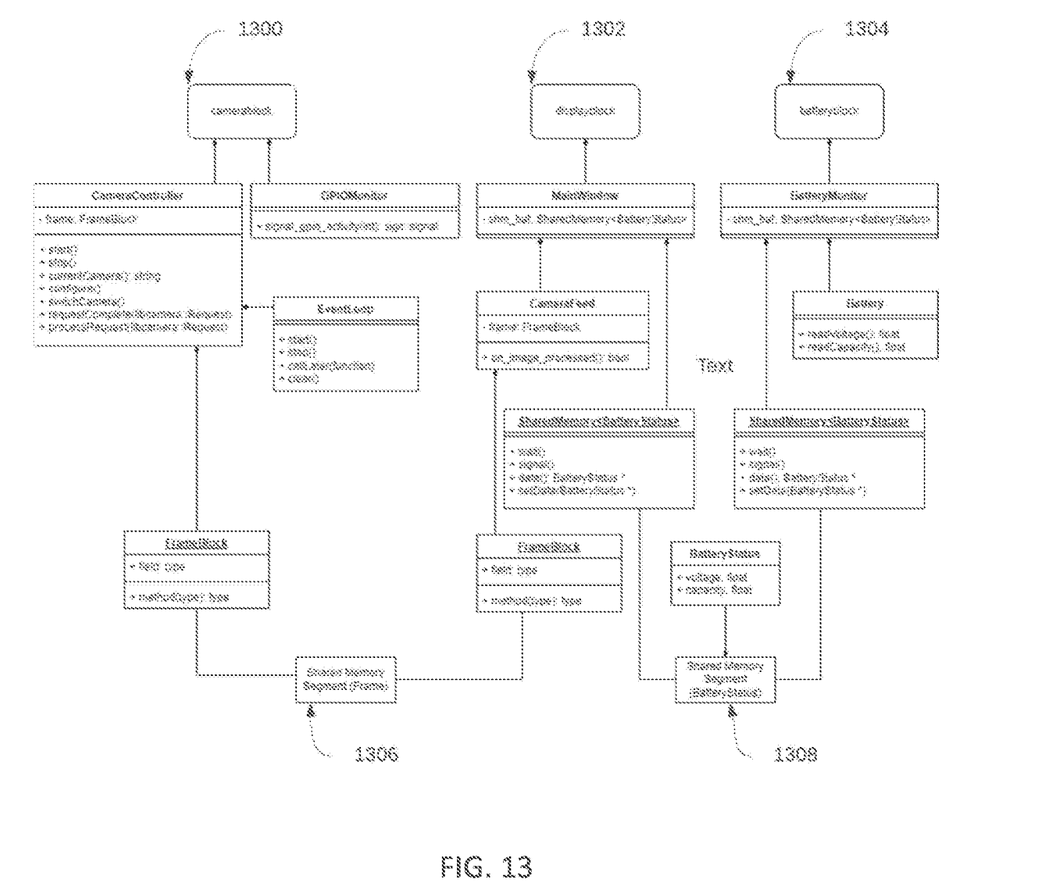
FIG. 13 illustrates three independent processes controlling the cameras, the battery, and the display, in accordance with an exemplary embodiment of the present invention.

FIG. 13 illustrates three independent processes controlling the cameras 1300, the battery 1304, and the display 1302. The processes use shared memory segments 1306, 1308 to transfer data to a user. More specifically, a microprocessor and a non-transitory computer-readable storage medium coupled to the microprocessor, wherein the non-transitory computer-readable storage medium is encoded with computer-readable instructions that implement independent processes controlling the cameras 1300, the battery 1304, and the display 1302. The streaming app controls both input and output from the camera. The app translates the input image format (NV12) to the image output format (RGB). The app also controls, via the toggle switch, which camera is being used as the input. The app also monitors the camera battery power level with a shutdown threshold.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

We claim:

1. A modular system configured to adapt a ballistic shield for viewing an image comprising:
   a front box configured to be installed upon a front side of the ballistic shield via a plurality of mounting brackets, wherein the front box Includes at least two cameras positioned to capture at least two images in front of the ballistic shield; wherein one of the two cameras operates in an electro-optical spectrum, and one of the two cameras operates in the Infra-red (IR) spectrum; and
   a rear box configured to be installed upon a back side of the ballistic shield via a plurality of mounting brackets, wherein the rear box comprises: a screen for viewing at least one of the at least two Images and a switch for powering an electronic component of the front box.

2. The modular system of claim 1, the rear box comprising a switch for selectively activating the at least two cameras.

3. The modular system of claim 1, further comprising a plurality of light emitting sources located on front box.

4. The modular system of claim 3, the rear box comprising a switch for selectively activating the plurality of light emitting sources.

5. The modular system of claim 1, wherein the at least two cameras are controlled by a streaming app.

* * * * *